(12) United States Patent
Nogami

(10) Patent No.: US 8,456,281 B2
(45) Date of Patent: Jun. 4, 2013

(54) NON-CONTACT IC MEDIUM COMMUNICATION DEVICE

(75) Inventor: Hidekatsu Nogami, Kyoto (JP)

(73) Assignee: Omron Corporation, Kyoto (JP)

( * ) Notice: Subject to any disclaimer, the term of this patent is extended or adjusted under 35 U.S.C. 154(b) by 554 days.

(21) Appl. No.: 12/675,371

(22) PCT Filed: Dec. 3, 2008

(86) PCT No.: PCT/JP2008/071953
§ 371 (c)(1),
(2), (4) Date: Feb. 25, 2010

(87) PCT Pub. No.: WO2009/072518
PCT Pub. Date: Jun. 11, 2009

(65) Prior Publication Data
US 2010/0245047 A1    Sep. 30, 2010

(30) Foreign Application Priority Data

Dec. 4, 2007 (JP) .................................. 2007-313431
Dec. 28, 2007 (JP) .................................. 2007-339851

(51) Int. Cl.
  H04Q 5/22   (2006.01)
  G08B 13/14  (2006.01)
  G08B 1/08   (2006.01)
  G01S 5/02   (2010.01)
  H04W 24/00  (2009.01)
  G06F 19/00  (2006.01)

(52) U.S. Cl.
  USPC ... 340/10.1; 340/10.3; 340/572.1; 340/568.1; 340/539.22; 340/539.11; 342/420; 342/465; 455/456.1; 700/245

(58) Field of Classification Search
  None
  See application file for complete search history.

(56) References Cited

U.S. PATENT DOCUMENTS

| 5,648,767 | A   | * | 7/1997  | O'Connor et al. ............ 340/928 |
| 6,427,913 | B1  | * | 8/2002  | Maloney ....................... 235/383 |
| 6,466,771 | B2  | * | 10/2002 | Wood, Jr. ...................... 455/101 |
| 6,476,756 | B2  |   | 11/2002 | Landt |
| 6,600,443 | B2  |   | 7/2003  | Landt |
| 6,950,009 | B1  | * | 9/2005  | Nysen ......................... 340/10.41 |

(Continued)

FOREIGN PATENT DOCUMENTS

| EP | 0 715 185 A1 | 6/1996 |
| EP | 1 610 258 A1 | 12/2005 |

(Continued)

Primary Examiner — Jennifer Mehmood
Assistant Examiner — Fekadeselassie Girma
(74) Attorney, Agent, or Firm — Dickstein Shapiro LLP

(57) ABSTRACT

The present invention provides a non-contact IC medium communication device (1) capable of detecting a non-contact IC medium (25) in a desired area with a simple configuration, by obtaining, from each of separate read areas, identification information of the non-contact IC medium that exists within the read area and a signal level of a reception signal received from the non-contact IC medium, the identification information and the signal level being associated with each other, performing difference operation or division with respect to respective signal levels of reception signals from the separate read areas, for each of the identification information, to obtain a composite signal level, and extracting the identification information whose composite signal level falls within a predetermined threshold range. The present invention further provides a method thereof, a program thereof, and a computer-readable storage medium storing the program.

3 Claims, 8 Drawing Sheets

1···RFID DETECTION DEVICE
10···ANTENNA
13···CONTROL SECTION
25a~25c···RFID TAG

U.S. PATENT DOCUMENTS

| | | | |
|---|---|---|---|
| 7,239,228 B2 * | 7/2007 | Kim et al. | 340/10.2 |
| 7,573,418 B2 | 8/2009 | Kawai et al. | |
| 7,978,066 B2 * | 7/2011 | Lim et al. | 340/539.13 |
| 2006/0082457 A1 * | 4/2006 | Artem et al. | 340/572.1 |
| 2006/0197652 A1 * | 9/2006 | Hild et al. | 340/10.2 |
| 2007/0262870 A1 * | 11/2007 | Kawai et al. | 340/572.7 |
| 2008/0018431 A1 * | 1/2008 | Turner et al. | 340/10.2 |
| 2008/0278327 A1 * | 11/2008 | Nierenberg et al. | 340/572.1 |
| 2009/0033463 A1 * | 2/2009 | Posamentier | 340/10.1 |
| 2010/0271181 A1 * | 10/2010 | Nogami | 340/10.1 |

FOREIGN PATENT DOCUMENTS

| | | |
|---|---|---|
| JP | 2001-230621 A | 8/2001 |
| JP | 2003-215237 A | 7/2003 |
| JP | 2004-252811 A | 9/2004 |
| JP | 2005-503531 A | 2/2005 |
| JP | 2006-10345 A | 1/2006 |
| JP | 2007-33415 A | 2/2007 |
| JP | 2008-3007 A | 1/2008 |

* cited by examiner

F I G. 1
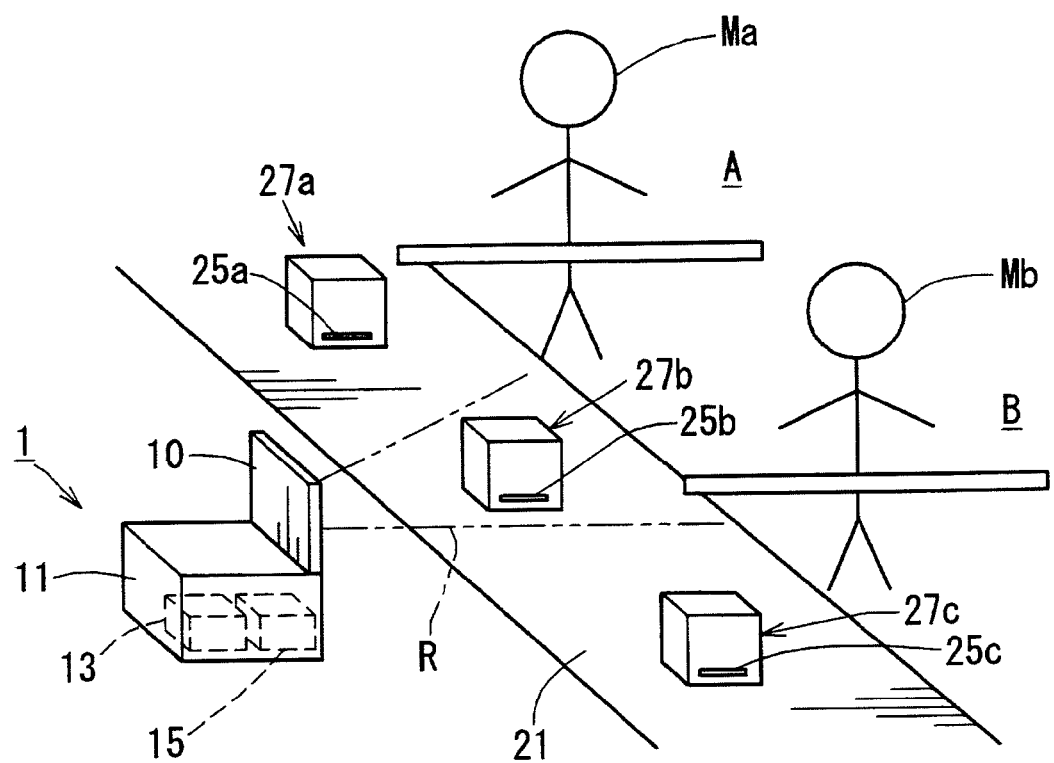
1 ⋯ RFID DETECTION DEVICE
10 ⋯ ANTENNA
13 ⋯ CONTROL SECTION
25a~25c ⋯ RFID TAG F I G. 2
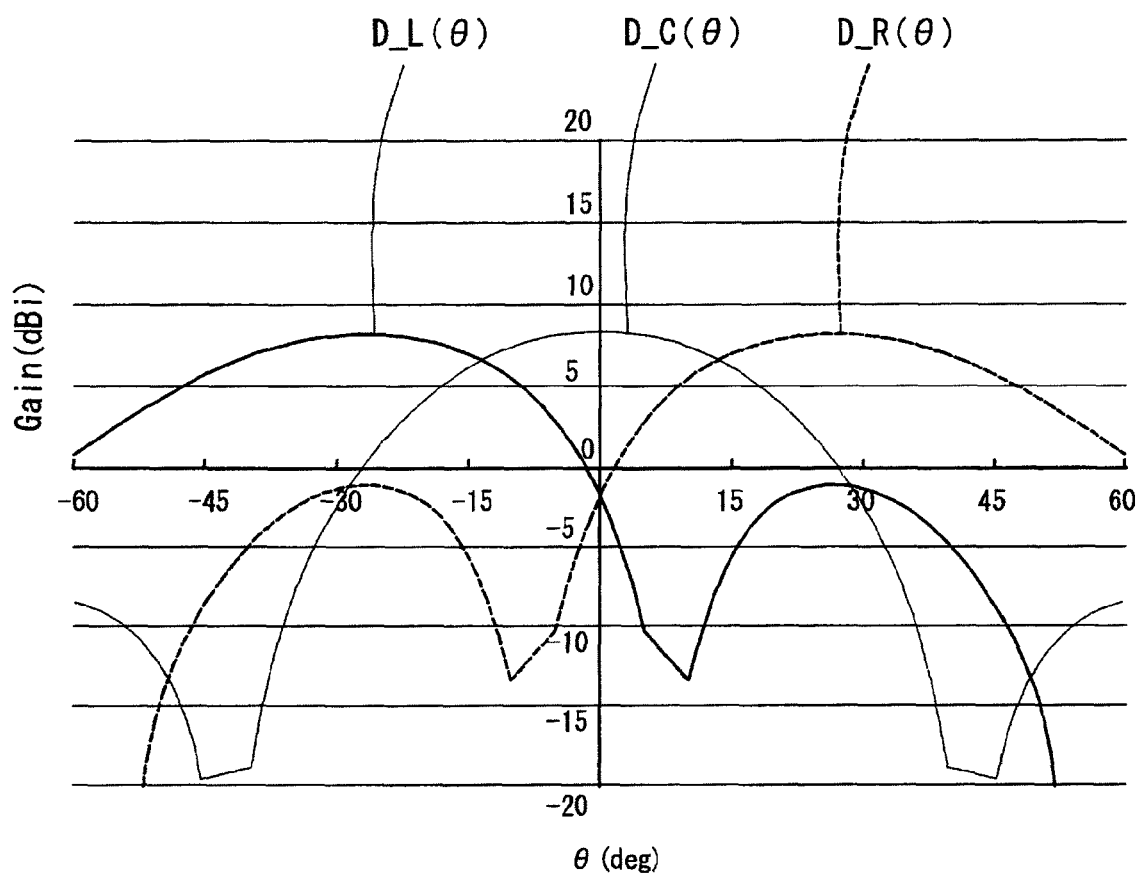

A1, A2 ··· THRESHOLD
Rx_DIF ··· RECEPTION LEVEL RATIO

F I G. 5

| UID (IDENTIFICATION INFORMATION) | RIGHTWARD DIRECTIONAL RECEPTION LEVEL (dB) | LEFTWARD DIRECTIONAL RECEPTION LEVEL (dB) | COMPOSITE RECEPTION LEVEL | EVALUATION |
|---|---|---|---|---|
| ******357 | −14.* | 3.* | −11.* | × |
| ******893 | 0.* | −5.* | −5.* | ○ |
| ⋮ | ⋮ | ⋮ | ⋮ | ⋮ |

R2···NORMAL AREA

F I G. 7
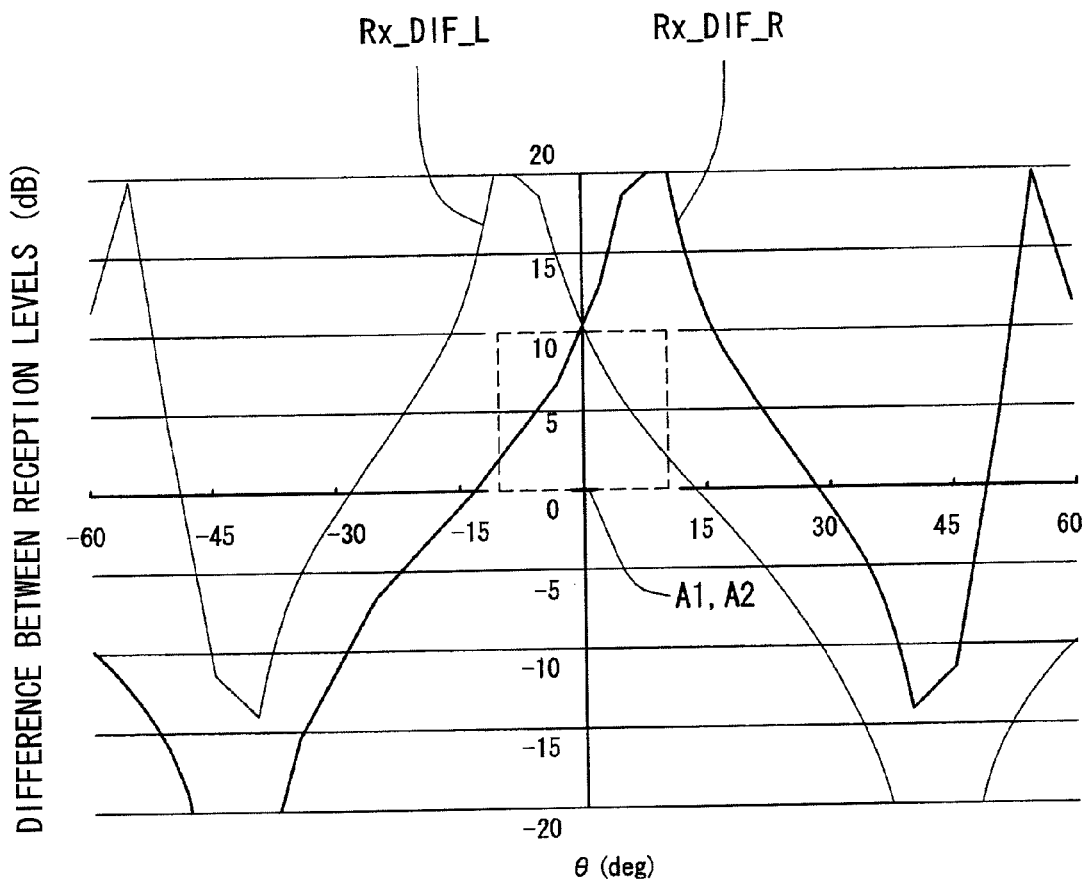
A1, A2⋯THRESHOLD
Rx_DIF_L⋯LEFTWARD RECEPTION LEVEL RATIO
Rx_DIF_R⋯RIGHTWARD RECEPTION LEVEL RATIO

NON-CONTACT IC MEDIUM COMMUNICATION DEVICE

TECHNICAL FIELD

The present invention relates to a non-contact IC medium communication device, for example, which detects a non-contact IC medium within a desired area, a method thereof, a program thereof, and a computer-readable storage medium storing the program.

BACKGROUND ART

Non-contact IC media capable of performing communication of information stored therein in a noncontact manner are conventionally utilized. Such non-contact IC media include a medium using a UHF band available for long-distance communication. In most cases, a single-element patch antenna is often used as an antenna for communicating with the non-contact IC medium using the UHF band. The single-element patch antenna has a half-power width (beamwidth) as broad as about 70 and therefore has the advantage of reading information from the non-contact IC media in a broad area.

However, in some cases, only the non-contact IC medium within a specific area need to be read. Particularly, such cases include, for example, a case that, under the situation where articles are transported while undergoing a plurality of working stages, only the non-contact IC medium of the article in one working operation need to be read.

In this case, it is considered to use an antenna with a narrow half-power width. However, such an antenna needs to be extremely large in size, like a multiple-element array antenna and a parabola antenna.

Meanwhile, there has been proposed a tag communication device that calculates the position of a non-contact IC medium on the basis of estimated incoming direction of a radio wave from the non-contact IC medium (see Patent Literature 1). The tag communication device applies different weights to outputs of antenna elements to detect the intensity of the radio wave in a specific direction.

However, the tag communication device requires complicated calculations in order to find the direction where the one non-contact IC medium exists.

PATENT LITERATURE 1

Japanese Patent Application Publication, Tokukai, No. 2006-10345 A (Publication Date: Jan. 12, 2006)

SUMMARY OF INVENTION

Technical Problem

The present invention has been made in view of the foregoing problems, and an object of the present invention is to provide a non-contact IC medium communication device capable of detecting, with a simple configuration, a non-contact IC medium in a desired area, a method thereof, a program thereof and a computer-readable storage medium storing the program.

Solution to Problem

The present invention is characterized by a non-contact IC medium communication device comprising: receiving means for obtaining, from each of separate read areas, identification information of a non-contact IC medium that exists within the read area and a signal level of a reception signal received from the non-contact IC medium, the identification information and the signal level being associated with each other; operating means for performing difference operation or division with respect to respective signal levels of reception signals from the separate read areas, for each of the identification information, to obtain a composite signal level; and extracting means for extracting the identification information whose composite signal level falls within a predetermined threshold range, a method thereof, and a program thereof.

The separate read areas differ from each other in their coverage areas, and read directions of an antenna having directivity in the separate read areas differ from each other.

The non-contact IC medium is a medium, such as an RF-ID tag, which can store information and perform communication in a noncontact manner. The non-contact IC medium includes a passive type medium which is not provided with a power source and obtains induced electromotive force from an external entity to transmit a response signal, a semi-passive type medium which is provided with a power source and transmits the response signal in response to a request from an external entity, and an active type medium which is provided with a power source and transmits signals at regular intervals.

The identification information is information by which the non-contact IC medium can be identified, such as an ID of an RF-ID tag.

A signal received from the non-contact IC medium is a response signal for the non-contact IC medium transmitting the identification information or another signal transmitted by the non-contact IC medium.

The receiving means can be realized by one or more array antennas whose directional patterns can be changed or by a plurality of antennas whose directional pattern cannot be changed.

The operating means and extracting means can be realized by means for performing an operation, such as CPU or MPU.

The non-contact IC medium communication device can be a reader/writer device which transmits/receives information to/from the non-contact IC medium or a reader device which reads information from the non-contact IC medium. Furthermore, the non-contact IC medium communication device also includes a device used as a detection device for detecting the non-contact IC medium.

Note that the non-contact IC medium communication device may be realized by a computer. In this case, the present invention also includes a non-contact IC medium communication program of the non-contact IC medium communication device which realizes the non-contact IC medium communication device by causing the computer to operate as each of the means, and a computer-readable storage medium storing the program.

Advantageous Effects of Invention

The present invention can provide a non-contact IC medium communication device capable of detecting a non-contact IC medium in a desired area with a simple configuration, a method thereof, a program thereof, and a computer-readable storage medium storing the program.

BRIEF DESCRIPTION OF DRAWINGS

FIG. 1 is an explanatory view of working stages in a factory and a RFID detection device.

FIG. 2 is a graph showing respective reception levels in different directional orientations.

FIG. 5 is an explanatory view of reception information stored in a storage section.

FIG. 7 is a graph of leftward and rightward reception ratios in Example 2.

REFERENCE SIGNS LIST

Figure 3:
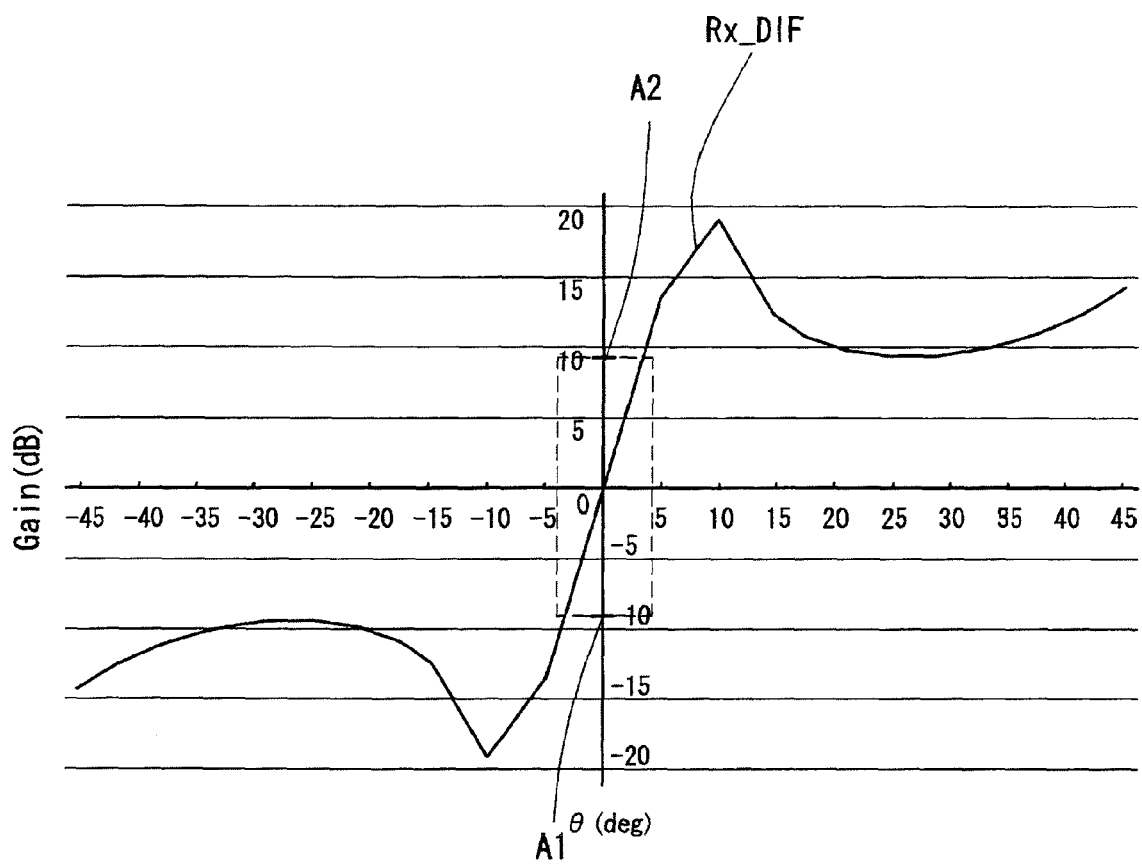
FIG. 3 is a graph of a reception level ratio.

1 . . . RFID DETECTION DEVICE, 10 . . . ANTENNA, 13 . . . CONTROL SECTION, 25 . . . RFID TAG, A1 and A2 . . . THRESHOLD, R2 . . . NORMAL AREA, Rx_L and Rx_R . . . RECEPTION LEVEL, Rx_DIF . . . RECEPTION LEVEL RATIO, Rx_DIF_L . . . LEFTWARD RECEPTION LEVEL RATIO, Rx_DIF_R . . . RIGHTWARD RECEPTION LEVEL RATIO

DESCRIPTION OF EMBODIMENTS

The following will describe an embodiment of the present invention with reference to the drawings.

[Embodiment 1]

FIG. 1 is an explanatory view of working stages in a factory and a RFID detection device 1.

In a factory, a conveyor belt 21 is placed along working stages A, B, and more stages. The conveyor belt 21 is driven by driving means (not shown) and transports articles 27 (27a through 27c) toward each of the working stages.

In the working stage A, a worker Ma performs an operation for the article 27a. In the working stage B, a worker Mb performs an operation for the article 27b.

The articles 27 have respective RFID tags 25 (25a through 25c) attached thereto. Each of the RFID tags 25 includes an antenna and an IC. The IC of the RFID tag 25 has a storage section that stores proper information such as an ID, which is identification information, and a name and specification of the article, which are information on the article.

In the working stage B, the RFID detection device 1 is placed which can read the RFID tag 25 existing within a detection area R. The RFID detection device 1 includes an antenna 10, a control section 13, and a storage section 15.

The antenna 10 includes a three-element array antenna which can adjust its directional orientations in a range from 35° to −35°.

The control section 13 includes a CPU, a ROM, and a RAM, and performs control operations and computations according to a program such as an RFID tag communication program.

The storage section 15 includes a storage device such as a nonvolatile memory or a hard disk, and stores a program and information (data).

Next, the following will describe the theory of a method for reading only the RFID tag 25 in a desired area with use of the RFID detection device. The present embodiment exemplifies that only the RFID tag 25 in a narrow area extending at angles from −15° to +15° from a front side of the antenna 10 is read, using the RFID detection device 1 as a pseudo-pencil beam antenna.

FIG. 2 is a graph showing a directional pattern of the antenna 10. In the graph, a longitudinal axis indicates a directional gain (Gain) of the antenna 10 in units of decibel (dBi). A lateral axis indicates an angle in units of degree (deg).

A leftward directional gain D_L ($\theta$) plotted in FIG. 2 indicates directional gains in given directions where the front side of the antenna 10 is 0°, when the directional orientation (angle $\theta$) of the antenna 10 is set to −35°.

A centerward directional gain D_C ($\theta$) plotted in FIG. 2 indicates directional gains in given directions where the front side of the antenna 10 is 0°, when the directional orientation (angle $\theta$) of the antenna 10 is set to 0°.

A rightward directional gain D_R ($\theta$) plotted in FIG. 2 indicates directional gains in given directions where the front side of the antenna 10 is 0°, when the directional orientation (angle $\theta$) of the antenna 10 is set to 35°.

Here, a reception level Rx_L can be expressed by the following equation (Equation 3). Note that relational equations in logarithmic form and antilogarithmic form are expressed by the following equations (Equations 1 and 2).

$$Rx = 10 \times \log_{10}(Rx') \quad \text{(Equation 1)}$$

$$Rx' = 10^{(Rx/10)} \quad \text{(Equation 2)}$$

where Rx (dBm) is expressed in logarithmic form, and Rx' (mW) is expressed in antilogarithmic form.

[A] Rx_L in logarithmic form $$Rx\_L = Pt + Dt(\theta) - Loss + D\_L(\theta)$$

where Pt is a transmission power of the tag, Loss is a free space loss, Dt($\theta$) is a directional gain of the tag, and D_L($\theta$) is a leftward directional gain, or

[B] Rx_L in antilogarithmic form $$Rx\_L' = Pt' \times Dt'(\theta) \times (\lambda/4\pi D)^2 \times D\_L'(\theta) \quad \text{(Equation 3)}$$

where Pt' is a transmission power of the tag, D is a communication distance, Dt'($\theta$) is a directional gain of the tag, and D_L'($\theta$) is a leftward directional gain.

Further, a reception level Rx_R can be expressed by the following equation:

[A] Rx_R in logarithmic form $$Rx\_R = Pt + Dt(\theta) - Loss + D\_R(\theta)$$

where Pt is a transmission power of the tag, Loss is a free space loss, Dt($\theta$) is a directional gain of the tag, and D_R($\theta$) is a rightward directional gain, or

[B] Rx_R in antilogarithmic form $$Rx\_R' = Pt' \times Dt'(\theta) \times (\lambda/4\pi D)^2 \times D\_R'(\theta) \quad \text{(Equation 4)}$$

where Pt' is a transmission power of the tag, D is a communication distance, Dt'($\theta$) is a directional gain of the tag, and D_R'($\theta$) is a rightward directional gain.

Regarding the foregoing two equations, an operation for a reception level ratio (subtraction (difference) for the logarithmic form and division for the antilogarithmic form) is performed to determine a reception level ratio Rx_DIF. The reception level ratio Rx_DIF is expressed by the following equation:

[A] Rx_DIF in logarithmic form (Equation 5)

$$\begin{aligned} Rx\_DIF &= Rx\_R - Rx\_L \\ &= \{Pt + Dt(\theta) - Loss + D\_R(\theta)\} - \\ &\quad \{Pt + Dt(\theta) - Loss + D\_L(\theta)\} \\ &= D\_R(\theta) - D\_L(\theta) \end{aligned}$$

-continued (B) Rx_DIF in antilogarithmic form $$Rx\_DIF' = Rx\_R'/Rx\_L'$$
$$= (Pt' \times Dt'(\theta) \times (\lambda/4\pi D)^2 \times D\_R'(\theta))/$$
$$(Pt' \times Dt'(\theta) \times (\lambda/4\pi D)^2 \times D\_L'(\theta))$$
$$= D\_R'(\theta) - D\_L'(\theta)$$

As expressed in Equation 5, by performing subtraction or division with respect to the equations for reception levels in different directional orientations, a function having only θ irrelevant to distances and performance of the tag (reflected power and directional gains of the tag) is obtained.

This function is shown in graph form in FIG. 3. In the graph, a longitudinal axis indicates the reception level ratio Rx_DIF (Gain) in units of decibel (dB). A lateral axis indicates an angle in units of degree (deg).

As shown in the graph, the reception level ratio Rx_DIF is expressed in a graph form that appears to be a linear function at about 0°, which is near the front side of the antenna 10. Note that the reception level ratio Rx_DIF at angles outside about ±10° is not expressed as a linear function because of a side lobe effect.

Therefore, only the RFID tag 25 whose reception level ratio Rx_DIF satisfies a condition is extracted with use of thresholds A1 and A2, which enables selection of only the RFID tag 25 that exists on the front side of the antenna 10. That is, except for the target RFID tag 25, the other RFID tags 25 can be eliminated even if they are read. The condition is expressed by the following equation:

$$-A1 < Rx\_DIF < A2 \quad \text{(Equation 6)}$$

where A1 is a lower threshold and A2 is an upper threshold.

Figure 4:
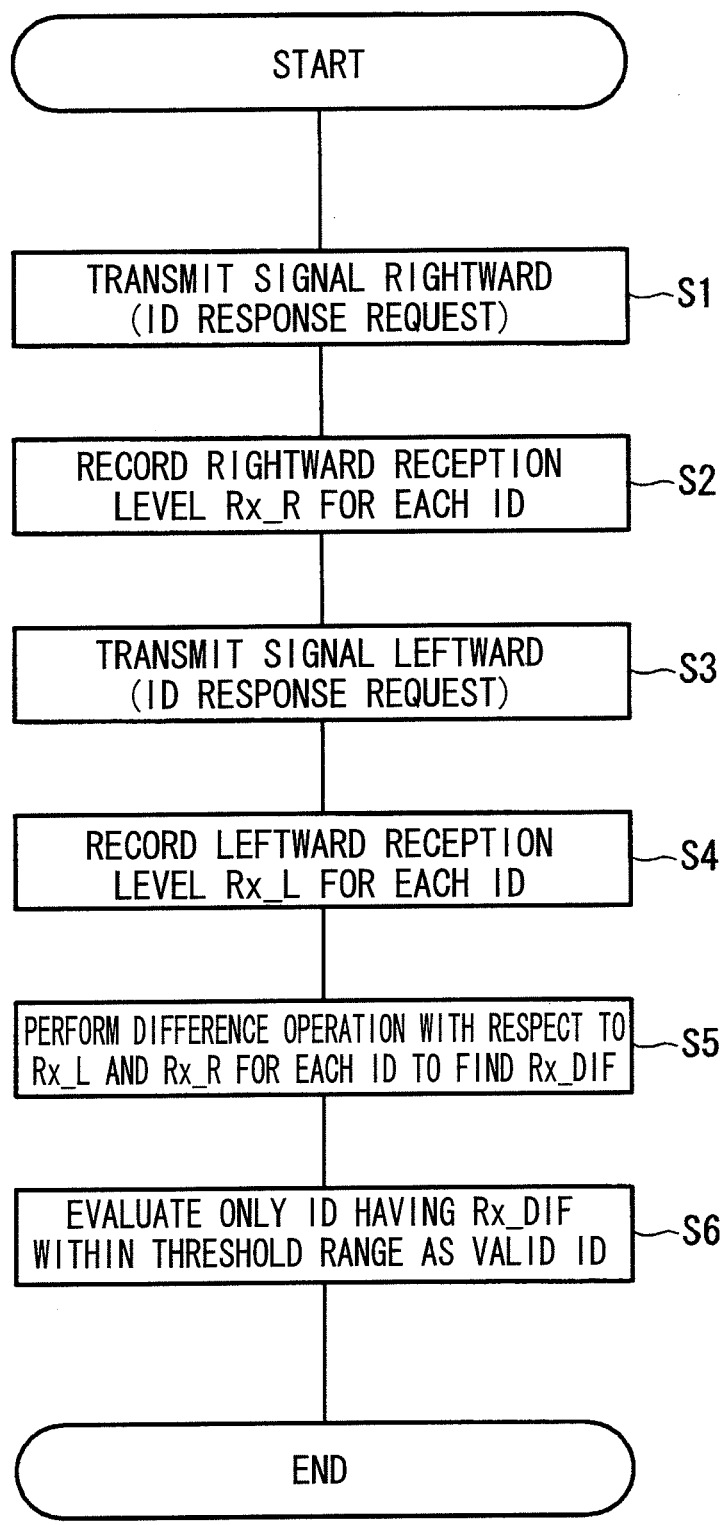
FIG. 4 is a flowchart of operations performed by a control section.

Next, the following will describe operations that the control section 13 in the RFID detection device 1 performs according to an RFID tag communication program to select only the RFID tag 25 in a target area and communicate with the selected RFID tag 25 on the basis of the foregoing theory, with reference to the flowchart shown in FIG. 4.

The control section 13 requests the antenna 10 to transmit a signal with its directional orientation set to 35° (step S1). The signal transmitted at this time is a signal to make the RFID tag 25 transmit the ID, which is the identification information for the RFID tag 25, in response to the request.

The control section 13 receives a response signal from the RFID tag 25 through the antenna 10 and then stores the received ID and the reception level Rx_R in the storage section 15 (step S2). At this time, the storage section 15 stores the ID and a rightward directional reception level, as shown in FIG. 5, which is an explanatory view of reception information stored in the storage section 15.

The control section 13 requests the antenna 10 to transmit a signal with its directional orientation set to −35° (step S3). As in the step S1, the signal transmitted at this time is a signal for making the RFID tag 25 transmit the ID, which is the identification information for the RFID tag 25, in response to the request.

The control section 13 receives a response signal from the RFID tag 25 through the antenna 10 and then stores the received ID and the reception level Rx_L in the storage section 15 (step S4). At this time, as shown in FIG. 5, the storage section 15 additionally stores a leftward directional reception level as information associated with the ID.

The control section 13 performs difference operation (subtraction for the logarithmic form and division for the antilogarithmic form) using the reception levels Rx_L and Rx_R for each ID to find the reception level ratio Rx_DIF, and then stores the reception level ratio Rx_DIF as information associated with the ID, as indicated in FIG. 5 (step S5).

The control section 13 extracts an ID having the reception level ratio Rx_DIF that falls in a range from predetermined thresholds A1 to A2 (in a range from −A1 to A2), and then evaluates only the extracted ID as a valid ID (step S6). This completes the operation.

With the above configuration and operations, the RFID detection device 1 can select and read the RFID tag 25 within a target area narrower than a coverage area where the antenna 10 can intrinsically read the RFID tag 25.

Figure 6:
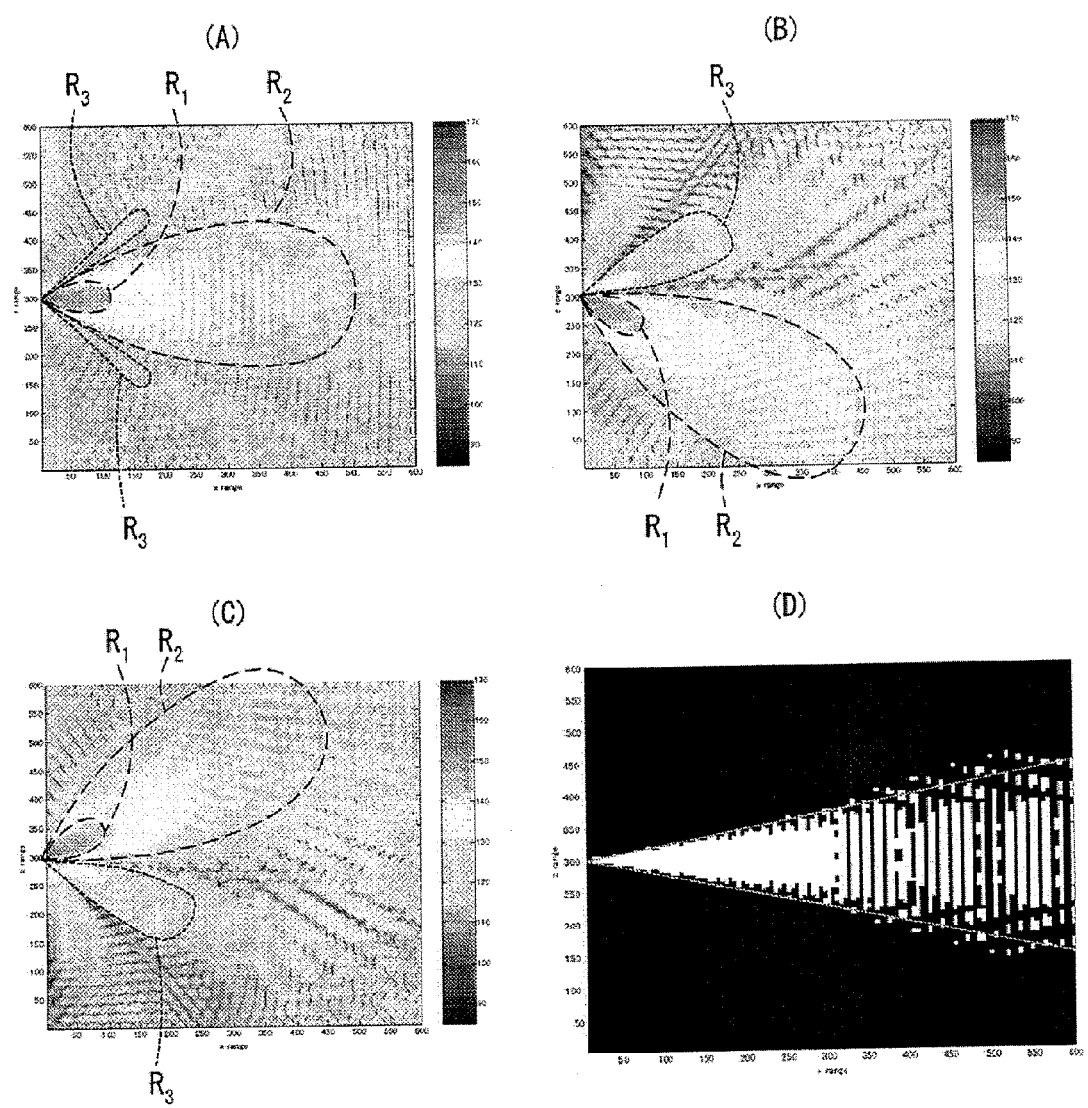
FIG. 6 is an explanatory view of a coverage area of an antenna.

More specifically, as shown in (A) through (C) in FIG. 6, the coverage area of the antenna 10 is originally vague.

That is, when the directional orientation is 0° in (A) of FIG. 6, no clear boundaries exist between a strong area R1 where the antenna 10 can receive a signal with high strength and a normal area R2 where the antenna 10 can receive a signal to some extent and between the normal area R2 and its surrounding area, and the all of these areas are smoothly continuous. Therefore, in one case the antenna 10 can read the RFID tag 25, and in another case the antenna 10 cannot read the RFID tag 25. This occurs depending on a surrounding environment of the antenna 10. Moreover, due to the presence of a side lobe area R3, it is difficult to determine a clear coverage area of the antenna 10 from one received result.

Similarly, in both cases of (B) of FIG. 6 where the directional orientation is shifted by 35° rightward and (C) of FIG. 6 where the directional orientation is shifted by −35° leftward, the coverage area of the antenna 10 is vague without boundaries.

On the contrary, (D) of FIG. 6 shows a threshold range obtained by synthesis of (B) of FIG. 6 where the directional orientation is shifted by 35° rightward and (C) of FIG. 6 where the directional orientation is shifted by −35° leftward by means of the foregoing method. In (D) of FIG. 6, the coverage area (target area for reading) is determined within a desired area (in (D) of FIG. 6, an area extending at angles from +15° to −15°, and the boundary between the coverage area and a non-coverage area is very clear. Therefore, in the RFID detection device 1, the antenna 10 can be used in the same manner as a high-accuracy pencil beam antenna, which enables reading of only the RFID tag 25 in the desired area.

Further, in the RFID detection device 1, the desired area can be adjusted easily with only changes of the thresholds A1 and A2.

Moreover, the RFID detection device 1 performs difference operation for the logarithmic form and division for the antilogarithmic form, which enables cancellation of an error caused by distance and performance of the tag (reflected power and directional gain of the tag) and highly-accurate detection.

Furthermore, the RFID detection device 1 performs reading in leftward and rightward directional orientations (in left and right directions) with a target direction set to be centerward. This makes it possible to reliably read the RFID tag 25 which exists in the target direction.

[Embodiment 2]

Next, the RFID detection device 1 in Embodiment 2 is described. In this case, hardware in the RFID detection device 1 is the same as in Example 1, but only the program-based software processing in Example 2 is different from that in Example 1. Accordingly, only the different processing is described, and the other detailed description is omitted because it is the same as in Example 1.

The reception level Rx_C described in Example 1 is expressed by the following equation:

[A] Rx_C in logarithmic form $$Rx\_C = Pt + Dt(\theta) - Loss + D\_C(\theta)$$

where Pt is a transmission power of the tag, Loss is a free space loss, Dt(θ) is a directional gain of the tag, and D_C(θ) is a centerward directional gain; or

[B] Rx_C in antilogarithmic form $$Rx\_C' = Pt' \times Dt'(\theta) \times (\lambda/4\pi D)^2 \times D\_C'(\theta) \quad \text{(Equation 7)}$$

where Pt' is a transmission power of the tag, D is a communication distance, Dt'(θ) is a directional gain of the tag, and D_C'(θ) is a centerward directional gain. Then, subtraction (subtraction in logarithmic form, and division in antilogarithmic form) is performed using the reception levels Rx_L and Rx_C described in Example 1 to find a leftward reception level ratio Rx_DIF_L. The leftward reception level ratio Rx_DIF_L is expressed by the following equation:

[A] Rx_DIF_L in logarithmic form  (Equation 8)

$$Rx\_DIF\_L = Rx\_C - Rx\_L$$
$$= D\_C(\theta) - D\_L(\theta); \text{ or}$$

[B] Rx_DIF_L in antilogarithmic form $$Rx\_DIF\_L' = Rx\_C'/Rx\_L'$$
$$= D\_C'(\theta) - D\_L'(\theta).$$

Further, subtraction (subtraction for the logarithmic form and division for the antilogarithmic form) is performed using the reception levels Rx_R and Rx_C described in Example 1 to find a rightward reception level ratio Rx_DIF_R. The rightward reception level ratio Rx_DIF_R is expressed by the following equation:

[A] Rx_DIF_R in logarithmic form  (Equation 9)

$$Rx\_DIF\_R = Rx\_C - Rx\_R$$
$$= D\_C(\theta) - D\_R(\theta); \text{ or}$$

[B] Rx_DIF_R in antilogarithmic form $$Rx\_DIF\_R' = Rx\_C'/Rx\_R'$$
$$= D\_C'(\theta) - D\_R'(\theta).$$

The leftward reception level ratio Rx_DIF_L and the rightward reception level ratio Rx_DIF_R are plotted in a graph form in FIG. 7. Therefore, if the RFID tag 25 which satisfies a condition is selected, an angle range (area) is limited, which enables extraction of the RFID tag 25 in the desired area. Note that in the example of FIG. 7, the thresholds A1 and A2 are identical. The condition is expressed by the following equation:

$$Rx\_DIF\_L > A1 \text{ AND } Rx\_DIF\_R > A2 \quad \text{(Equation 10)}$$

where A1 and A2 are thresholds.

Note that a remainder (or a quotient) from the directional gains is conclusively required by the equations described in the present embodiment, and the remainder (or the quotient) is obtained as a ratio. Therefore, the present embodiment is described in units of mW or dBm. However, this is not the only possibility. The same result can be obtained even if dBW is used as the unit. Similarly, even with a conversion factor calculated with respect to an isotropic antenna using dBi as the unit as described in the present embodiment, or even with a conversion factor calculated with respect to a dipole antenna using dBd as the unit, which is different from the unit used in the present embodiment, the same result can be obtained.

Figure 8:
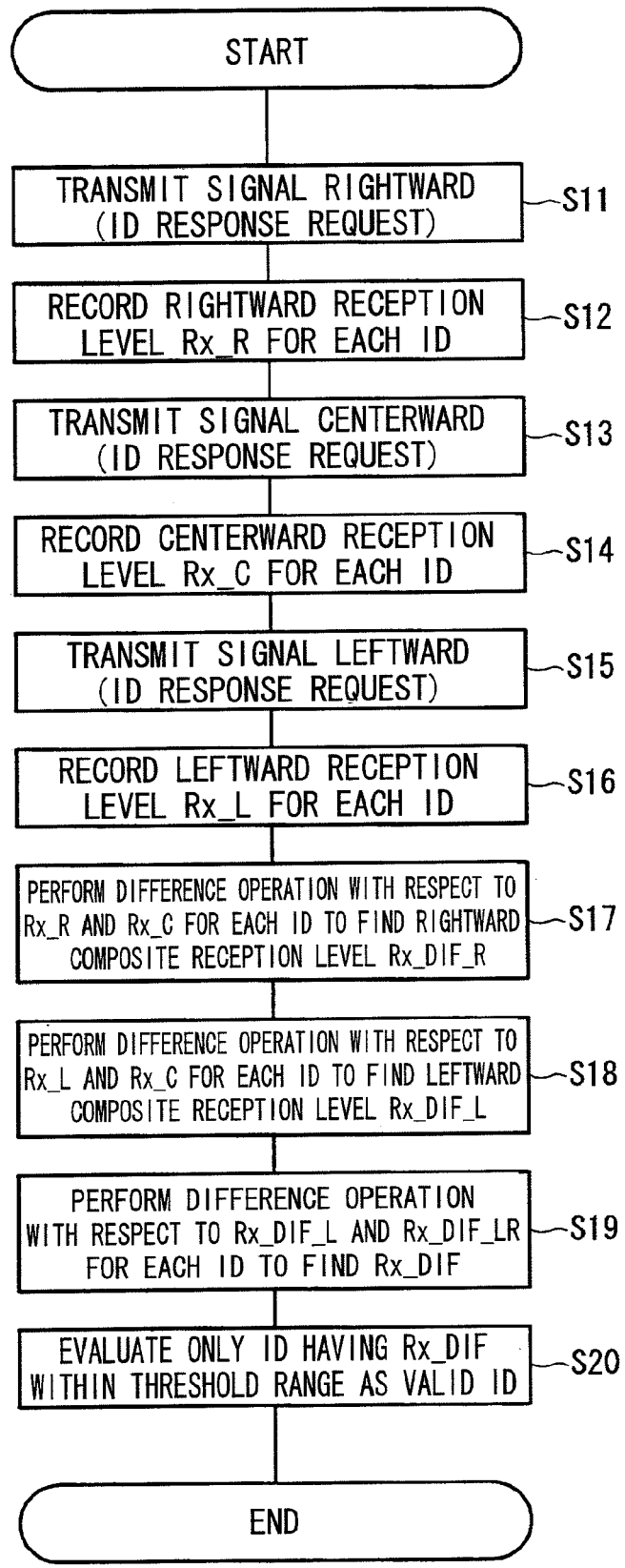
FIG. 8 is a flowchart of operations performed by a control section in Example 2.

Next, the following will describe operations that the control section 13 in the RFID detection device 1 performs according to an RFID tag communication program to select only the RFID tag 25 in a target area and communicate with the selected RFID tag 25 on the basis of the foregoing theory, with reference to the flowchart shown in FIG. 8.

The control section 13 requests the antenna 10 to transmit a signal with its directional orientation set to 35° (step S11). The signal transmitted at this time is a signal for making the RFID tag 25 transmit the ID, which is the identification information for the RFID tag 25, in response to the request.

The control section 13 receives a response signal from the RFID tag 25 through the antenna 10, and then stores the received ID and the reception level Rx_R in the storage section 15 (step S12).

The control section 13 requests the antenna 10 to transmit a signal with its directional orientation set to 0° (step S13). As in the step S1, the signal transmitted at this time is a signal for making the RFID tag 25 transmit the ID, which is the identification information for the RFID tag 25, in response to the request.

The control section 13 receives a response signal from the RFID tag 25 through the antenna 10, and then stores the received ID and the reception level Rx_C in the storage section 15 (step S14).

The control section 13 requests the antenna 10 to transmit a signal with its direction orientation set to −35° (step S15). As in the step S1, the signal transmitted at this time is a signal for making the RFID tag 25 transmit the ID, which is the identification information for the RFID tag 25, in response to the request.

The control section 13 receives a response signal from the RFID tag 25 through the antenna 10, and then stores the received ID and the reception level Rx_L in the storage section 15 (step S16).

The control section 13 performs difference operation or division using the reception levels Rx_R and Rx_C for each ID to find the rightward reception level ratio Rx_DIF_R (step S17).

The control section 13 performs difference operation or division using the reception levels Rx_L and Rx_C for each ID to find the leftward reception level ratio Rx_DIF_L (step S18).

The control section 13 performs difference operation or division using the rightward reception level ratio Rx_DIF_R and the leftward reception level ratio Rx_DIF_L for each ID to find the reception level ratio Rx_DIF (step S19).

The control section 13 extracts an ID having the reception level ratio Rx_DIF that falls in a range from predetermined thresholds A1 to A2 (in a range where the Rx_DIF_R is larger than A1 and the Rx_DIF_L is larger than A2), and then evaluates only the extracted ID as a valid ID (step S20). This completes the operation.

With the above configuration and operations, the same result as in Example 1 can be obtained, and the RFID tag 25 in the target area (within an area extending at target angles) can be detected.

Particularly, in the Example 2, since the centerward reception level Rx_C is used, a length of the coverage area in the centerward direction, which is the target area, can be made adequately longer than the range in Example 1. That is, in Example 1, the centerward reception level Rx_C is not used. Therefore, the length of the coverage area in the centerward direction, which is the target area, decreases with increase of the difference in directional orientation angle between the reception level Rx_L and the reception level Rx_R.

On the contrary, in Example 2, the centerward reception level Rx_C is used. Therefore, the length of the coverage area in the centerward direction, which is the target area, does not decrease, and the coverage area with a long length and in a narrow width can be arranged.

This makes it possible to make the conveyor belt separated well away from the antenna 10, which enables an easier design for a series of working stages than in Example 1.

Note that in each of the foregoing embodiments, if the absence of an ID is confirmed corresponding to an ID which has been read in a first directional orientation in steps S4, n14 and n16 which are the steps of performing reading after the directional orientation is shifted, information associated with the ID may be discarded without being stored. Furthermore, in the steps S2 and S4 (the steps S12, n14, and n16 in Embodiment 2), the information may be stored independently, and only if the presence of the same ID is confirmed in both of the steps (those three steps in Embodiment 2), the information corresponding to the ID may be extracted and subjected to operation. This makes it possible to easily eliminate the RFID tag 25 which has been received only in one of the directional orientations from target tags to be detected.

A non-contact IC medium communication device of the present invention corresponds to the RFID detection device 1 in the embodiment. Similarly, the following will describe correspondences between components in the present invention and components in the foregoing embodiments:

receiving means corresponds to the antenna 10;
operating means corresponds to the control section 13 which executes step S5;
extracting means corresponds to the control section 13 which executes step S6;
a non-contact IC medium corresponds to the RFID tag 25;
a threshold range corresponds to a range from threshold −A1 to threshold A2;
separate read areas correspond to normal areas R2;
signal levels corresponds to reception levels Rx_L and Rx_R;
a composite signal level corresponds to a reception level ratio Rx_DIF;
a first composite level corresponds to a leftward reception level ratio Rx_DIF_L;
a second composite level corresponds to a rightward reception level ratio Rx_DIF_R;
a receiving process corresponds to steps S2, S4, S12, S14, and S16;
an operating process corresponds to steps S5 and S19;
an extracting process corresponds to steps S6 and S20;
a non-contact IC medium communication program corresponds to the RFID tag communication program;
identification information corresponds to the ID; and
a signal received from the non-contact IC medium corresponds to a response signal from the RFID tag 25. However, the present invention is not limited to the configurations of the foregoing embodiments, and many embodiments can be obtained.

The invention claimed is:

1. A non-contact IC medium communication device comprising:
a single antenna for obtaining, from each of separate read areas, identification information of a non-contact IC medium that exists within the read area and a signal level of a reception signal received from the non-contact IC medium, the identification information and the signal level being associated with each other;
a control section for performing difference operation or division with respect to respective signal levels of reception signals from the separate read areas, for each of the identification information, to obtain a composite signal level, and for extracting the identification information whose composite signal level falls within a predetermined threshold range,
wherein one of the separate read areas extends to a first side of a target area and another of the separate read areas extends to a second side of the target area;
wherein the single antenna is configured to sense different ones of the separate read areas by shifting its directional orientation;
wherein the read area is further provided in a center area which has the target area at a center thereof, and
wherein the control section:
performs difference operation or division with respect to the signal level of the reception signal in one of the read areas on the both sides of the target area and the signal level of the reception signal in the center area to obtain a first composite signal level,
performs difference operation or division with respect to the signal level of the reception signal in the other of the read areas on the both sides of the target area and the signal level of the reception signal in the center area to obtain a second composite signal level, and
performs difference operation or division with respect to the first and second composite signal levels to obtain a composite signal level.

2. A method of non-contact IC medium communication, comprising the steps of:
using a single antenna to obtain, from each of separate read areas, identification information of a non-contact IC medium that exists within the read area and a signal level of a reception signal received from the non-contact IC medium, the identification information and the signal level being associated with each other, wherein one of the read areas is further provided in a center area which has the target area at a center thereof;
performing difference operation or division with respect to respective signal levels of reception signals from the separate read areas, for each of the identification information, to obtain a composite signal level;
extracting the identification information whose composite signal level falls within a predetermined threshold range;
performing a difference operation or division with respect to the signal level of the reception signal in one of the read areas on the both sides of the target area and the signal level of the reception signal in the center area to obtain a first composite signal level,
performing a difference operation or division with respect to the signal level of the reception signal in the other of the read areas on the both sides of the target area and the signal level of the reception signal in the center area to obtain a second composite signal level, and
performing a difference operation or division with respect to the first and second composite signal levels to obtain a composite signal level,
wherein one of the separate read areas extends to a first side of a target area and another of the separate read areas extends to a second side of the target area; and
wherein the single antenna senses different ones of the separate read areas by shifting its directional orientation.

3. A non-transitory computer-readable storage medium storing a non-contact IC medium communication program for causing a computer to perform:

a receiving process of using a single antenna to obtain, from each of separate read areas, identification information of a non-contact IC medium that exists within the read area and a signal level of a reception signal received from the non-contact IC medium, the identification information and the signal level being associated with each other, wherein one of the read areas is further provided in a center area which has the target area at a center thereof;

an operating process of performing difference operation or division with respect to respective signal levels of reception signals from the separate read areas, for each of the identification information, to obtain a composite signal level;

an extracting process of extracting the identification information whose composite signal level falls within a predetermined threshold range, a difference operation or division operation with respect to the signal level of the reception signal in one of the read areas on the both sides of the target area and the signal level of the reception signal in the center area to obtain a first composite signal level, a difference operation or division operation with respect to the signal level of the reception signal in the other of the read areas on the both sides of the target area and the signal level of the reception signal in the center area to obtain a second composite signal level, and a difference operation or division operation with respect to the first and second composite signal levels to obtain a composite signal level, wherein one of the separate read areas extends to a first side of a target area and another of the separate read areas extends to a second side of the target area; and wherein the receiving process uses the single antenna to sense different ones of the separate read areas by shifting the directional orientation of the single antenna.

* * * * *